2,748,021
Patented May 29, 1956

2,748,021

SOLUBILIZED BENZAL DERIVATIVES OF α-METHYL-α-PHENYL HYDRAZINES AND ULTRAVIOLET RADIATION ABSORBING PRODUCTS THEREOF

James A. Van Allan, Rochester, N. Y., assignor to Eastman Kodak Company, Rochester, N. Y., a corporation of New Jersey No Drawing. Application June 24, 1953,
Serial No. 363,907

13 Claims. (Cl. 117—33.3)

This invention relates to materials which are ultraviolet absorbers and to their use in the fabrication of light filters, light protective wrappings, organic plastic materials and the like. More particularly, this invention relates to solubilized benzal derivatives of α-methyl-α-phenyl hydrazine.

It is well known that many organic substances are affected by the action of ultraviolet light. For instance, various colored objects, textiles and dyed substances will fade when exposed to long periods of sunlight. This appears to be particularly true of colored articles having relatively thin cross sections, such as colored photographic prints, transparencies, dyed organic fibers and the like.

It is known that organic plastics, resins, film-forming materials and the like become colored, brittle and eventually deteriorate when exposed to sunlight. In order to vitiate the deleterious and damaging effect of sunlight upon plastics and other materials, incorporation of stabilizers such as, for example, 4-benzoyl resorcinol (U. S. Patent No. 2,568,894) and the like, have been suggested by the prior art. However, while many of these compounds are excellent ultraviolet absorbers, their absorption characteristics may change considerably when the pH is on the alkaline side. In some instances, films containing certain ultraviolet inhibitors have a definite yellow color when the pH is greater than 8. Furthermore, some of these compounds lose a great portion of their light stability with an alkaline pH. In addition, some of these inhibitors are known to be very active couplers, which makes them unsuitable for many photographic purposes.

I have found that solubilized benzal derivatives of α-methyl-α-phenyl hydrazine are effective as ultraviolet absorbers and, in addition, are water-soluble. These may be dispersed directly in gelatin, applied to the surface of processed photographic materials, or used as a component of a resin glaze for application to the processed material, in all of which uses they eliminate the disadvantages listed above.

Accordingly, an object of this invention is to provide a light filter capable of substantial absorption in the region of the near ultraviolet. Another object is to provide a light filter having a substantially complete and preferential absorption of light within the wave length band of 3000–4000 Å. Another object of this invention is to provide new compositions of matter which are solubilized benzal derivatives of α-methyl-α-phenyl hydrazine. A further object of this invention is to provide an ultraviolet inhibitor which is independent of pH for stability, remains substantially water white after ultraviolet absorption and is compatible with photographic applications.

Solubilized benzal derivatives of α-methyl-α-phenyl hydrazine are formed by condensing α-methyl-α-phenyl hydrazine with, for example, an aldehyde containing a solubilizing group selected from —OH and salts of —SO₃H or —COOH, and the like, to give absorbers of high molecular extinction and high stability with respect to ultraviolet light fading. The aldehydes which are selected to condense with α-methyl-α-phenyl hydrazine are, for example, selected from the group consisting of:

4-methoxy-3-sulfo benzaldehyde sodium salt
4-hydroxy benzaldehyde-3-sulfonic acid (sodium salt)
o-Sulfobenzaldehyde (sodium salt)
2,6-di-tert.-butyl-4-hydroxybenzaldehyde
2-methoxy-5-sulfobenzaldehyde (sodium salt)
4-propoxy-3-sulfobenzaldehyde (sodium salt)
4-carboxymethoxy benzaldehyde (sodium salt)
2-carboxy benzaldehyde (sodium salt)

Particularly good ultraviolet absorbers are formed by use of benzaldehyde sodium salts, such as are shown herein in the examples. The particular benzaldehyde sodium salt which is selected depends upon the desired grouping in the product.

These compounds may advantageously be employed in a wide variety of carrying media in which a water-soluble inhibitor is desired. Gelatin used in photographic applications is a particularly important application of such compounds. However, other applications in protective wrappings for perishable foods, incorporation in textiles, and the like, are within the scope of this invention.

The following examples illustrate the practice of this invention but this invention is not limited thereto:

*Example 1.—α-Methyl-α-phenyl-3-sulfo-4-methoxy-benzalhydrazone (sodium salt)*

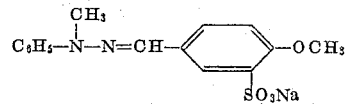

4-methoxy-3-sulfo benzaldehyde sodium salt (12 g.) was dissolved in 120 ml. of hot water containing 20 ml. of ethanol. α-Methyl-α-phenyl hydrazine (6.5 ml.) and 0.25 ml. of acetic acid was slowly added to the hot aqueous solution of the sodium salt. After standing overnight at room temperature, the crystals which had separated were filtered off and recrystallized from water to give 14 g. of α-methyl-α-phenyl-3-sulfo-4-methoxy-benzal hydrazone as the sodium salt.

Anal. calcd. for $C_{15}H_{15}O_4N_2SNa$: C, 52.5; H, 4.45. Found: C, 52.4; H, 4.7.

*Example 2.—α-Methyl-α-phenyl-4-hydroxy-3-sulfobenzalhydrazine (sodium salt)*

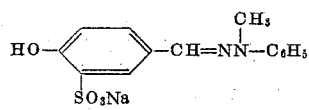

4-hydroxy benzaldehyde-3-sulfonic acid (sodium salt) (12.2 g.) and α-methyl-α-phenyl hydrazine (7 ml.) were mixed in 100 ml. of water at 50–55° C. with good stirring. Upon the addition of a few ml. of acetic acid, there was an immediate reaction. After a few hours at room temperature, the precipitated product was filtered off and recrystallized from water with Norite; yield, 12 g.

Anal. calcd. for $C_{14}H_{13}O_4N_2SNa$: C, 51.2; H, 4.0. Found: C, 51.0; H, 3.9.

*Example 3.*—α-*Methyl*-α-*phenyl*-o-*sulfobenzalhydrazone* (*sodium salt*)

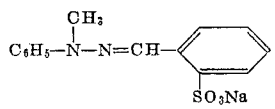

Pure o-sulfobenzaldehyde (sodium salt) (10.4 g.) was dissolved in 100 ml. of hot water. This solution was held at a temperature of 85–90° C. and vigorously agitated while adding 6.1 ml. of α-methyl-α-phenylhydrazine containing 2 drops of acetic acid. The acetic acid acts as a catalyst. After 1.5 hours at 80–90° C., the mixture was allowed to stand at 10–15° C. for 4 hours. The crystalline precipitate which formed was filtered off, redissolved in 150 ml. of hot water, and treated with 3 g. of activated charcoal, and again allowed to crystallize; yield, 15 g. of product, pure white plate-like crystals.

Anal. calcd. for $C_{14}H_{13}O_3N_2SNa$: C, 53.8; H, 4.2. Found: C, 53.2; H, 4.4.

*Example 4.*—o-*Sulfobenzal*-α-*methyl*-α-*phenylhydrazone* (*p-anisidine salt*)

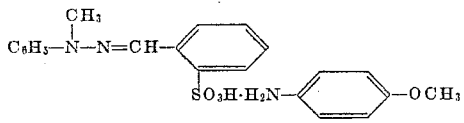

α-Methyl-α-phenyl-o-sulfobenzalhydrazone (sodium salt) (6.0 g.), dissolved in 230 ml. of hot water, was added to a solution of 3 g. of p-anisidine in 200 ml. of water containing 10 ml. of conc. hydrochloric acid. The anisidine salt was precipitated immediately. After 1 hour the anisidine salt was filtered off and recrystallized from ethyl alcohol, M. P. 235° C.

Anal. calcd. for $C_4H_{23}O_4N_3S$: C, 61.2; H, 5.6. Found: C, 61.1; H, 5.9.

*Example 5.*—2,6-*di*-*tert*.-*butyl*-4-*hydroxybenzal*-α-*methyl*-α-*phenyl hydrazone*

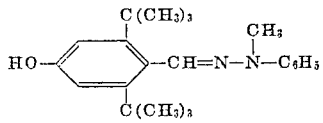

2,6-di-tert.-butyl-4-hydroxybenzaldehyde (4.6 g.) and 3 ml. of α-methyl-α-phenylhydrazine were refluxed in 50 ml. of methanol for 1.5 hours. On cooling, 6 g. of the product separated; this was collected by filtration and recrystallized from ethanol; yield, 6.0 g., M. P. 112° C.

In a similar manner, when 4-hydroxybenzaldehyde was substituted for 2,6-di-tert.-butyl-4-hydroxybenzaldehyde in the above preparation, 4-hydroxybenzal-α-methyl-α-phenyl hydrazone, M. P. 140° C., was obtained in 83% yield.

Anal. calcd. for $C_{14}H_{14}N_2O$: C, 74.4; H, 6.2. Found: C, 74.6; H, 6.3.

*Descriptions of dispersion in gelatin*

*Example 1.*—One-half gram of the product described in Example 3 is dissolved with the aid of heat in 10 ml. of water. The resulting solution is cooled somewhat, mixed with 12 ml. of 10% gelatin and coated. The resultant coating, after two weeks' exposure on a south window, gives excellent protection when overcoated on a multilayer paper coating.

*Example 2.*—The gel carrier in the above description may be replaced by 8% solutions of "Cellosize," polyvinyl alcohol, or a 7% solution of the sodium salt of carboxymethyl cellulose. In all cases, a clear, colorless, transparent film is obtained upon drying.

It will be seen from the above examples that this invention lends itself to a wide diversity of practice depending upon the particular solubilized derivative which is required. It could not easily be foreseen that these particular hydrazones would be so oxygen and light stable since it is well known that benzal phenyl hydrazone is strongly light-sensitive.

According to the "Handbook of Trade Names" by Zimmerman and Lavine, 1953, Industrial Research Service, "Cellosize" is hydroxyethylcellulose which is available in both the dry form and as a 10% aqueous solution. "Cellosize" is the trade mark of Carbide and Carbon Chemicals Co.

2,6-di-tertiary-butyl-4-hydroxybenzaldehyde is described in an article by Tod W. Campbell and Galvin M. Coppinger "Journal of American Chemical Society," vol. 74, page 1469. Reference is made to this article in "Chemical Abstracts," vol. 48, 1954, page 1988.

I claim:

1. The sodium salt of α-methyl-α-phenyl-3-sulfo-4-methoxybenzalhydrazone having the formula

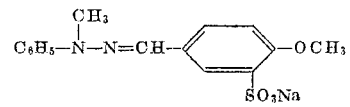

2. The sodium salt of α-methyl-α-phenyl-4-hydroxy-3-sulfobenzalhydrazine having the formula

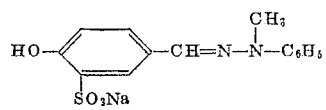

3. The sodium salt of α-methyl-α-phenyl-o-sulfobenzalhydrazone having the formula

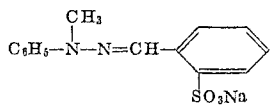

4. 2,6-di-tert.-butyl-4-hydroxybenzal-α-methyl-α-phenyl hydrazone having the formula

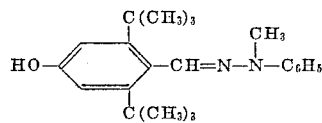

5. Solubilized benzal derivatives of alpha-methyl-alpha-phenyl-hydrazine formed by condensing alpha-methyl, alpha-phenyl hydrazine with an aldehyde selected from the class consisting of 4-methoxy-3-sulfobenzaldehyde, 4-hydroxy benzaldehyde-3-sulfonic acid, o-sulfobenzaldehyde and 2,6-di-tert.-butyl-4-hydroxybenzaldehyde.

6. A photographic print having a coating thereon comprising a solubilized derivative of alpha-methyl-alpha-phenyl hydrazine as described in claim 5.

7. An ultraviolet absorbing composition of matter comprising a gelatin layer containing alpha-methyl-alpha-phenyl-ortho-sulfobenzalhydrazone.

8. An ultraviolet absorbing composition of matter comprising a hydroxyethylcellulose layer containing alpha-methyl-alpha-phenyl-ortho-sulfobenzalhydrazone.

9. A photographic material provided with a gelatin emulsion layer containing a developed, fixed and washed picture and a protective layer of gelatin containing alpha-methyl-alpha-phenyl-ortho-sulfobenzalhydrazone.

10. A photographic material provided with a gelatin emulsion layer containing a developed, fixed and washed picture and a protective layer of polyvinyl alcohol containing alpha-methyl-alpha-phenyl-ortho-sulfobenzalhydrazone.

11. A photographic material provided with a gelatin emulsion layer containing a developed, fixed and washed picture and a protective layer of hydroxyethylcellulose containing alpha-methyl-alpha-phenyl-ortho-sulfobenzalhydrazone.

12. A photographic material provided with a gelatin emulsion layer containing a developed, fixed and washed picture and a protective layer of carboxymethylcellulose containing alpha-methyl-alpha-phenyl-ortho-sulfobenzalhydrazone.

13. An ultraviolet absorbing composition of matter selected from the class consisting of gelatin, polyvinyl alcohol, carboxymethylcellulose and hydroxyethylcellulose containing in ultraviolet absorbing amounts, alpha-methyl-alpha-phenyl-ortho-sulfobenzalhydrazone.

References Cited in the file of this patent

UNITED STATES PATENTS

| | | |
|---|---|---|
| 1,935,712 | Herdieckerhoff et al. | Nov. 21, 1933 |
| 2,173,480 | Jung | Sept. 19, 1939 |
| 2,568,894 | Mackey | Sept. 25, 1951 |
| 2,614,940 | Freyermuth et al. | Oct. 21, 1952 |

FOREIGN PATENTS

| | | |
|---|---|---|
| 493,308 | Great Britain | Oct. 6, 1938 |